UNITED STATES PATENT OFFICE 2,430,058

MINERAL OIL RUSTPROOFING COMPOSITION

Joseph H. Klaber, Norwood, Pa., assignor to Quaker Chemical Products Corp., Conshohocken, Pa., a corporation of Pennsylvania No Drawing. Application June 8, 1944,
Serial No. 539,388

2 Claims. (Cl. 106—14)

The invention relates to compositions particularly adapted for rapidly forming fluid adsorbed films on metals. The invention includes metals coated with such compositions and processes for using such compositions for rust-proofing and also in the art of machining metals.

A principal object of the invention is to provide rust preventive compositions of the type giving a readily removable coating.

Another object is to provide metal machining compositions such as cutting oils and grinding compounds.

Further objects and advantages of the invention will become apparent as the following detailed description progresses.

In the arts of cutting and of protecting metals, it is highly important to provide a film which adheres to the metal directly and immediately, for example, by forces of electrical attraction, in such manner that the film will not break or fail and will adhere to the metal surface selectively even in the presence of large amounts of inert oils or solvents. Furthermore, these films must be formed instantly since time is of essence in all metal machining operations.

In prior art, various compounds have been used as rust preventives and have also been known to impart qualities of film strength and/or lubricity. Among these compounds may be mentioned in particular degras, various acidic bodies formed by the oxidation of petroleum, lead soaps, and the like. These compounds have been used as such or intermixed with various oils or with petrolatum, paraffin, waxes, petroleum sulphonates, and the like. Certain ketonic bodies have also been used as such, or in intermixture with petroleum products.

I have discovered that organic substances which contain ketone groups, when intermixed with certain soluble film strength compounds, have a very much higher composite film strength, as expressed either by machining qualities, or by rust prevention tests, than either components of the compounds has been used alone. This is illustrated by the following tabulation, which shows a number of ketones and film strength substances, and the rust preventive potencies of these used either as such, or in combination with each other as disclosed in the present invention.

| Addend (to 95% petrolatum) | Days in cabinet at 100% humidity before breakdown |
|---|---|
| 5% Dihexadecyl Ketone | 6 |
| 5% Pentaerythritol Mono Caprate | 5 |
| 5% Degras | 16 |
| 5% Cholesterol | 7 |
| 2.5% Dihexadecyl Ketone<br>2.5% Pentaerythritol Mono Caprate | 60 plus |
| 2.5% Dihexadecyl Ketone<br>2.5% Degras | 60 plus |
| 2.5% Dihexadecyl Ketone<br>2.5% Cholesterol | 60 plus |

With regard to the theoretical explanation of this very surprising finding, it is my belief that the ketone molecules form a mono molecular film adjacent to the metal, so that the oxygen of the keto group attaches itself to metal molecules by forces of electro kinetic attraction. The alkyl groups of the ketones will spread out parallel to the film surface. However, in this type of film there will still be areas which are not directly covered by the protective films. At these points a breakdown may start.

I believe that these unprotected areas are covered by the addition of the secondary oil soluble film strength agents, which we believe arranges itself in a pauci-molecular layer superimposed upon the ketone layer, so as to adhere or partly dissolve itself in the oil soluble alkyl groups of the ketones, forming a secondary film which covers all the interstitial parts of the primary ketone films. In this manner a rust preventive layer of very much higher strength and tenacity is created. While no direct proof for the correctness of this theory exists, it is strongly supported by the experimental results just tabulated. However, I do not wish to limit myself to any particular theoretical explanation of the phenomenon observed as the utility of its application is independent of any theory.

I may employ for the purposes of this invention any ketonic substance, particularly ketones which are compatible with the other ingredients employed in an oil solution.

Suitable film strength agents are alcohols, esters and fatty acids of molecular weight greater than 200. These materials are preferably oil soluble and themselves oily or greasy in nature, although they may be waxy if thoroughly compatible with the composition with which they are used. To insure their permanence in the final composition, they should be of low volatility.

Examples of suitable film strength materials are:

Fatty acids:
　Stearic acid
　Palmitic acid
　Oleic acid
　Linoleic acid
　Linolenic acid
　Ricinoleic acid
　Combinations of these, as in:
　　Castor oil fatty acids
　　Cottonseed oil fatty acids
　　Corn oil fatty acids
　　Tallow fatty acids Organic hydroxy compounds (alcohols and phenols):
　Oleyl alcohol
　Cholesterol
　P-tert-phenoxyethanol
　Pentaerythritol monocaprate
　Di-tertiary butyl-metacresol Esters—organic:
　Linseed oil
　Lard oil
　Castor oil
　Sperm oil
　Peanut oil
　Neutral degras (lanolin)
　Butyl stearate
　Pentaerythritol monocaprate Esters—inorganic:
　Triphenyl phosphate
　Tricresyl phosphate
　Tributyl borate The mixture of ketone and film strength agent is generally used in minor proportion with a petroleum hydrocarbon. The proportions may be varied widely and are not critical. For rustproofing compositions it is generally preferred to mix the ketone and film strength material with a major proportion of petrolatum to form a pasty or solid composition. For cutting oils the ketone and film strength compound is generally mixed with a major proportion of a mineral oil to form a liquid composition. However, liquid rustproofing compositions may be formed by using mineral oil instead of the petrolatum.

While the primary application of the invention is in the field of rust prevention, perhaps equally important applications can be found in the field of metal cutting. In this case an essential quality is stability of an oil film formed on the metal which has been cut free and also that such a film form rapidly in order to minimize friction between the chip and the face of the tool. To do this, it is essential that the oil be able to penetrate quickly, and instantly form upon the metal surfaces a film of great adhesion and resistance. Yet this film must be fluid as any gumming or hardening or formation of lacquer like films would be extremely objectionable. It has been found that compositions containing ketones in conjunction with a film forming agent as disclosed possess these qualities in a very high degree.

Examples of rust preventive compositions and of metal machining oils based upon the present discovery are given below by way of illustration:

Example I

| | Per cent |
|---|---|
| Dihexadecyl ketone | 2.5 |
| Neutral degras | 2.5 |
| Amorphous wax—M. P. 160° F. | 10.0 |
| High melting petrolatum | 85.0 |

This composition comprises a very high type of hot dip rustproofer, far superior to the same composition omitting either the ketone or the degras, or both.

Example II

| | Per cent |
|---|---|
| Hexyl phenyl ketone | 3 |
| Octyl alcohol | 8 |
| Amber petrolatum | 39 |
| Stoddard solvent | 50 |

This composition is a superior rustproofer of a far higher rust resistance than the same compound omitting the ketone or the alcohol, or both.

Example III

| | Per cent |
|---|---|
| Lard oil | 15 |
| Laurone | 5 |
| 300 vis. mineral oil | 37 |
| Emulsifier (mineral oil sulfonates and other materials) | 43 |

In this soluble cutting oil substitution of the 5% of ketone for an equal quantity of lard oil greatly improved tool life in cutting or grinding.

Example IV

| | Per cent |
|---|---|
| Diundecylenyl ketone | 10 |
| Lard oil | 40 |
| 100 vis. mineral oil | 40 |
| Sulfur | 10 |

The mixed oils were sulfurized by heating with the sulfur to 350° F. for two hours. The resulting cutting oil was superior in wetting for metal and gave longer tool life than the same composition using lard oil in place of the ketone.

In Examples III and IV it will be realized, of course, that lard oil is the secondary agent improving the effect of the ketone. This effect was not realized fully by sulfuring a mixture of mineral oil and ketone.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:

1. A mineral oil rustproofing composition comprising a petroleum hydrocarbon vehicle containing a corrosion inhibiting amount of a mixture of a mono-ketone having a long alkyl chain and octyl alcohol the alcohol being present in greater amount than the ketone.

2. A mineral oil rustproofing composition comprising a petrolatum containing a corrosion inhibiting amount of a mixture of hexyl phenyl ketone and octyl alcohol the alcohol being present in greater amount than the ketone.

JOSEPH H. KLABER.

(References on following page)

REFERENCES CITED

The following references are of record in the file of this patent:

UNITED STATES PATENTS

| Number | Name | Date |
|---|---|---|
| 2,075,757 | Conquest | Mar. 30, 1937 |
| 2,182,992 | Lebo | Dec. 12, 1939 |
| 2,184,952 | Zimmer et al. | Dec. 26, 1939 |
| 2,348,715 | Adams et al. | May 16, 1944 |
| 2,349,044 | Jahn | May 16 1944 |
| 2,186,018 | Griesinger | Jan. 9, 1940 |

FOREIGN PATENTS

| Number | Country | Date |
|---|---|---|
| 548,262 | Great Britain | Oct. 2, 1942 |